(12) United States Patent
Kawamura et al.

(10) Patent No.: US 9,687,781 B2
(45) Date of Patent: Jun. 27, 2017

(54) DESULFURIZATION METHOD AND DEVICE FOR SULFURIC ACID PRODUCTION DEVICE

(71) Applicant: Chiyoda Corporation, Yokohama-shi (JP)

(72) Inventors: Kazushige Kawamura, Yokohama (JP); Dai Takeda, Yokohama (JP); Eiji Awai, Yokohama (JP); Noboru Takei, Yokohama (JP); Masataka Uemura, Yokohama (JP)

(73) Assignee: Chiyoda Corporation, Yokohama-shi (JP)

( * ) Notice: Subject to any disclaimer, the term of this patent is extended or adjusted under 35 U.S.C. 154(b) by 0 days.

(21) Appl. No.: 14/646,858

(22) PCT Filed: Oct. 25, 2013

(86) PCT No.: PCT/JP2013/078919
§ 371 (c)(1),
(2) Date: May 22, 2015

(87) PCT Pub. No.: WO2014/083982
PCT Pub. Date: Jun. 5, 2014

(65) Prior Publication Data
US 2015/0298056 A1    Oct. 22, 2015

(30) Foreign Application Priority Data

Nov. 30, 2012 (JP) ................. 2012-263795

(51) Int. Cl.
*C01B 17/74* (2006.01)
*C01B 17/76* (2006.01)
(Continued)

(52) U.S. Cl.
CPC ....... *B01D 53/8609* (2013.01); *B01D 53/507* (2013.01); *B01D 53/75* (2013.01);
(Continued)

(58) Field of Classification Search
CPC ....... C01B 17/74; C01B 17/76; C01B 17/765; C01B 17/775; C01B 17/80; C01B 17/803; C01B 17/806
See application file for complete search history.

(56) References Cited

U.S. PATENT DOCUMENTS 2,730,431 A * 1/1956 Haltmeier ............... C01B 17/74
                                                                    23/306
3,294,487 A * 12/1966 Pauling ................. C01B 17/775
                                                                    423/522
(Continued)

FOREIGN PATENT DOCUMENTS

JP    08-332345 A    12/1996
JP    11-290688 A    10/1999
(Continued)

OTHER PUBLICATIONS

Yaemi Yamazaki, "Sulfuric Acid Plant of Mitsui Engineering & Shipbuilding Co., Ltd. based on the Latest Technology," Mitsui Zosen Technical Review, No. 200, Jun. 2010, pp. 41-45.
(Continued)

*Primary Examiner* — Timothy Vanoy
(74) *Attorney, Agent, or Firm* — Locke Lord LLP (57) ABSTRACT

This desulfurization device is for desulfurizing a discharge gas which contains sulfur oxides and which was discharged from a device for sulfuric acid production that includes a concentrated-sulfuric-acid production step in which sulfur trioxide gas obtained by oxidizing sulfur dioxide gas is absorbed in an aqueous sulfuric acid solution while supplying water thereto to thereby produce sulfuric acid having a
(Continued)

concentration as high as 90 wt % or more but less than 99 wt %, the desulfurization device comprising: a desulfurization tower in which the sulfur oxides are removed from the discharge gas and, simultaneously therewith, dilute sulfuric acid is formed from the sulfur oxides; and a dilute sulfuric acid mixer which, in the concentrated-sulfuric-acid production step, mixes the dilute sulfuric acid with the aqueous sulfuric acid solution.

14 Claims, 3 Drawing Sheets

(51) Int. Cl.
| | | |
|---|---|---|
| *C01B 17/80* | (2006.01) | |
| *B01D 53/86* | (2006.01) | |
| *B01D 53/50* | (2006.01) | |
| *B01D 53/75* | (2006.01) | |
| *C02F 1/72* | (2006.01) | |
| *C02F 1/78* | (2006.01) | |
| *B01D 53/14* | (2006.01) | |
| *C02F 1/28* | (2006.01) | |
| *C02F 101/10* | (2006.01) | |
| *C02F 103/18* | (2006.01) | |

(52) U.S. Cl.
CPC .......... *C01B 17/74* (2013.01); *B01D 53/1481* (2013.01); *B01D 2252/2056* (2013.01); *B01D 2255/702* (2013.01); *C02F 1/283* (2013.01); *C02F 1/72* (2013.01); *C02F 1/78* (2013.01); *C02F 2101/101* (2013.01); *C02F 2103/18* (2013.01)

(56) References Cited

U.S. PATENT DOCUMENTS

| | | | | |
|---|---|---|---|---|
| 3,318,662 | A * | 5/1967 | Pauling | ................ B01D 53/507 |
| | | | | 423/244.03 |
| 3,853,502 | A * | 12/1974 | Dorr | ...................... C01B 17/74 |
| | | | | 423/522 |
| 5,194,239 | A * | 3/1993 | Masseling | ............... C01B 17/74 |
| | | | | 423/522 |
| 2013/0115159 | A1 | 5/2013 | Vera-Castaneda | |

FOREIGN PATENT DOCUMENTS

| | | | |
|---|---|---|---|
| JP | 2000-024461 A | 1/2000 | |
| JP | 2003-171122 A | 6/2003 | |
| JP | 2004-337776 A | 12/2004 | |
| JP | 2005-246220 A | 9/2005 | |
| WO | WO-2011/139390 A2 | 11/2011 | |
| WO | WO-2015058804 A1 * | 4/2015 | ......... C01B 17/7655 |

OTHER PUBLICATIONS

International Search Report mailed Jan. 7, 2014, issued for PCT/JP2013/078919.

* cited by examiner

DESULFURIZATION METHOD AND DEVICE FOR SULFURIC ACID PRODUCTION DEVICE

TECHNICAL FIELD

The present invention relates to a desulfurization method and a desulfurization device for a sulfuric acid production device of contact process.

BACKGROUND ART

Sulfuric acid is a basic chemical for various chemical industries and has been produced on a large scale for many years. Methods for producing sulfuric acid are broadly classified into two processes: lead chamber process and contact process. The lead chamber process includes steps of introducing sulfurous acid gas ($SO_2$), which is obtained by roasting of metal sulfides such as sulfide ore, into a Glover tower and a lead chamber together with air, and allowing the sulfurous acid gas to react with air to produce sulfuric acid in the presence of a catalyst such as nitrogen oxide or nitric acid. On the other hand, the contact process, as described in Non-Patent Literature 1, includes steps of burning sulfur or roasting sulfides to produce sulfurous acid gas, allowing the sulfurous acid gas to proceed oxidation reaction for producing sulfur trioxide gas (sulfuric anhydride gas ($SO_3$)) in the presence of a vanadium pentoxide ($V_2O_5$) catalyst, and allowing the sulfur trioxide gas to be absorbed in an aqueous sulfuric acid solution in an $SO_3$ absorption tower to produce concentrated sulfuric acid.

However, the lead chamber process may cause coloration of sulfuric acid due to a residue of sulfuric acid hydrogen (nitrogen oxide) ($HSO_4.NO$) produced as an intermediate product, and moreover this process can only produce a sulfuric acid with relatively low concentration. Therefore, in recent years, the contact process has been exclusively used which can efficiently produce concentrated sulfuric acid. It is to be noted that sulfuric acid hydrogen (nitrogen oxide) is referred to as nitrosylsulfuric acid, nitrosyl sulfate, or nitrosyl hydrogen sulfate (hereinafter, referred to as nitrosylsulfuric acid). The contact process may also contain nitrosylsulfuric acid in the concentrated sulfuric acid when nitrogen oxide, produced by the roasting treatment or the like of sulfides, coexists in the treated gas. However, since the concentration of the nitrosylsulfuric acid in this case is low, there is almost no problem with the quality of the concentrated sulfuric acid as a product.

Recently there is a trend to emphasize so-called eco-friendly facilities which give consideration for environmental conservation. In response to this trend, various measures are also implemented in sulfuric acid production facilities. For example, the above-stated $SO_3$ absorption tower is designed to have two-stage configuration so as to improve a removal rate, and packing material for the $SO_3$ absorption tower is improved so as to enhance a gas-liquid contact efficiency. Studies on the improvement of the catalyst and optimization of the operating temperature are also made to improve an oxidation rate of sulfurous acid gas, so as to decrease a residue of sulfurous acid gas that is left unabsorbed in the $SO_3$ absorption tower while enhancing the operating efficiency of the sulfuric acid production device.

Figure 1:
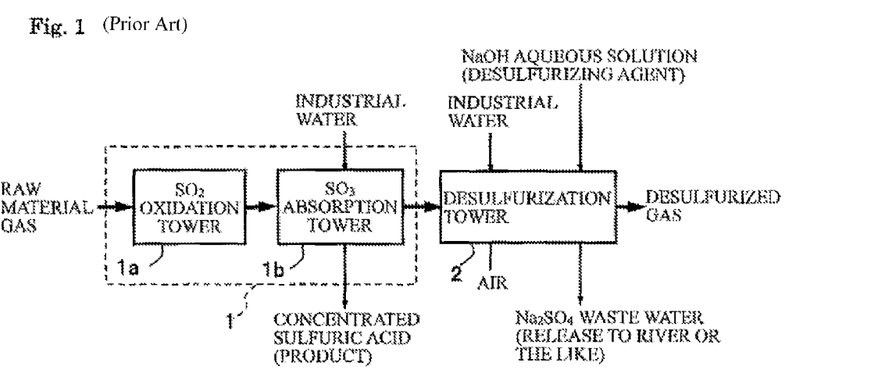
FIG. 1 A block flow diagram showing a conventional desulfurization device together with a sulfuric acid production device upstream thereof.

Further, a desulfurization device is provided downstream of the $SO_3$ absorption tower such that sulfur oxides such as sulfurous acid gas and $SO_3$, which are generated in the sulfuric acid production step, are removed to a lower concentration level. An example of such a desulfurization device is a desulfurization tower 2 as shown in FIG. 1 which is conventionally provided to desulfurize the outlet gas from a sulfuric acid production device 1 consisting of an $SO_3$ oxidation tower 1a and an $SO_3$ absorption tower 1b, and an alkali neutralization method using NaOH or $Mg(OH)_2$ or a lime-gypsum method using limestone to produce gypsum as a by-product is performed in the desulfurization tower 2. However, this method requires a chemical such as neutralizing alkali and generates sulfate as a waste, which necessitates complicated operation such as handling of solids and complicated operational control for the use of the chemical and dispose of the waste. Accordingly, this method imposes a large cost and moreover has a concern to cause secondary pollution.

Under the circumstances, there is proposed a method for desulfurizing a flue gas using an activated carbon instead of the above-stated method. For example, Patent Literatures 1 and 2 propose a method in which a flue gas containing sulfur oxide is brought into contact with a catalyst to convert the sulfur oxide to dilute sulfuric acid, and then the dilute sulfuric acid is collected and removed. The catalyst used in this method is produced by adding fluororesin to an activated carbon power, kneading them under application of a shear force, and then forming the kneaded product into a predetermined shape.

Patent Literature 3 discloses a flue-gas-desulfurizing method in which a flue gas containing sulfurous acid gas is processed by two stages where sulfurous acid gas in the flue gas is absorbed by a liquid absorbent of limestone slurry in the first stage, and a residue of the sulfurous acid gas is processed with an activated carbon catalyst in the second stage. A dilute sulfuric acid produced in the second stage is disposed of by being mixed with the liquid absorbent in the first stage.

Patent Literature 4 proposes a technique in which a purification tower is provided downstream of a flue gas desulfurization device that removes sulfur oxides in a flue gas. Patent Literature 4 discloses that a catalyst layer made of activated carbon fibers is provided in the purification tower, and that the flue gas treated in the flue gas desulfurization device is introduced to the catalyst layer together with water so as to produce dilute sulfuric acid from sulfur oxides. It also discloses that the dilute sulfuric acid thus produced is supplied to the flue gas desulfurization device and is disposed of therein.

Patent Literature 5 discloses a flue-gas-desulfurizing method in which a flue gas containing sulfur oxides is humidified and cooled, and then introduced to an activated carbon-based catalyst to produce dilute sulfuric acid from the sulfur oxides in the flue gas. Patent Literature 5 also discloses a technique in which the dilute sulfuric acid is condensed by using heat of the flue gas.

CITATION LIST

Patent Literatures

Patent Literature 1: JP 11-290688 A
Patent Literature 2: JP 2000-24461 A
Patent Literature 3: JP 08-332345 A
Patent Literature 4: JP 2004-337776 A
Patent Literature 5: JP 2005-246220 A

Non Patent Literature

Non Patent Literature 1: Yaemi Yamazaki, "Sulfuric Acid Plant of Mitsui Engineering & Shipbuilding Co., Ltd.

based on the Latest Technology," MITSUI ZOSEN TECHNICAL REVIEW, No. 200, June 2010, pp. 41-45

SUMMARY OF INVENTION

Technical Problem

In contrast to the alkali neutralization method, these methods in Patent Literatures 1 to 5 for desulfurization with the activated carbon-based catalyst are excellent in view of low environmental load. However, these methods in Patent Literatures 1 to 5 have less commonly used except for specific applications because sulfuric acid produced by these methods is diluted. The present invention has been made in view of these circumstances and it is an object of the present invention to provide a method and a device capable of economically desulfurizing a gas discharged from a sulfuric acid production device of contact process without imposing a large costs for chemical purchase and sulfate disposal while achieving higher yield of concentrated sulfuric acid by effectively utilizing dilute sulfuric acid produced by the desulfurization.

Solution to Problem

In order to achieve the above object, there is provided a desulfurization method for a sulfuric acid production device of contact process according to the present invention. The method for desulfurizing a discharge gas which contains sulfur oxides and which was discharged from a device for sulfuric acid production that includes a concentrated-sulfuric-acid production step in which sulfur trioxide gas obtained by oxidizing sulfur dioxide gas is absorbed in an aqueous sulfuric acid solution while supplying water thereto to thereby produce sulfuric acid having a concentration as high as 90 wt % or more but less than 99 wt %, the method comprising: a desulfurization step in which the sulfur oxides are removed from the discharge gas and, simultaneously therewith, dilute sulfuric acid is formed from the sulfur oxides; and a mixing step which, in the concentrated-sulfuric-acid production step, mixes the dilute sulfuric acid with the aqueous sulfuric acid solution.

There is also provided a desulfurization device for a sulfuric acid production device of contact process according to the present invention. The desulfurization device for desulfurizing a discharge gas which contains sulfur oxides and which was discharged from a device for sulfuric acid production that includes a concentrated-sulfuric-acid production step in which sulfur trioxide gas obtained by oxidizing sulfur dioxide gas is absorbed in an aqueous sulfuric acid solution while supplying water thereto to thereby produce sulfuric acid having a concentration as high as 90 wt % or more but less than 99 wt %, the desulfurization device comprising: desulfurization means in which the sulfur oxides are removed from the discharge gas and, simultaneously therewith, dilute sulfuric acid is formed from the sulfur oxides; and mixing means which mixes the dilute sulfuric acid with the aqueous sulfuric acid solution.

There is also provided a sulfuric acid production plant according to the present invention. The sulfuric acid production plant comprising: concentrated-sulfuric-acid production means in which sulfur trioxide gas obtained by oxidizing sulfur dioxide gas is absorbed in an aqueous sulfuric acid solution while supplying water thereto to thereby produce sulfuric acid having a concentration as high as 90 wt % or more but less than 99 wt %; and mixing means for mixing dilute sulfuric acid produced by removing sulfur oxides from a discharge gas containing the sulfur oxides with the aqueous sulfuric acid solution in the concentrated-sulfuric-acid production means.

Advantageous Effects of Invention

According to the present invention, concentrated sulfuric acid is produced by removing sulfur oxides from a gas discharged from a sulfuric acid production device while producing dilute sulfuric acid from the sulfur oxides, and then mixing the dilute sulfuric acid with an aqueous sulfuric acid solution, and therefore, the discharge gas can be desulfurized without using chemicals nor disposing sulfuric acid salts (sulfate), and thus affecting no environmental impact. In addition, the discharge gas can be economically desulfurized without imposing costs for chemical purchase or sulfate disposal. Further, yield of concentrated sulfuric acid can be increased because the dilute sulfuric acid obtained by the desulfurization can be effectively utilized for the production of concentrated sulfuric acid.

DESCRIPTION OF EMBODIMENTS

A desulfurization method according to the present invention is directed to a method for desulfurizing a discharge gas which contains sulfur oxides and which was discharged from a device for sulfuric acid production that includes a concentrated-sulfuric-acid production step in which sulfur trioxide gas obtained by oxidizing sulfur dioxide gas is absorbed in an aqueous sulfuric acid solution while supplying water thereto to thereby produce sulfuric acid having a concentration as high as 90 wt % or more but less than 99 wt % (hereinafter, also simply referred to as concentrated sulfuric acid). The method includes a desulfurization step in which the sulfur oxides are removed from the discharge gas and, simultaneously therewith, dilute sulfuric acid is formed from the sulfur oxides; and a mixing step which, in the concentrated-sulfuric-acid production step, mixes the dilute sulfuric acid with the aqueous sulfuric acid solution.

Hereinafter, an example of a sulfuric acid production plant capable of advantageously performing the desulfurizing method of the present invention will be described with reference to FIG. 2. A sulfuric acid production plant 1 shown in FIG. 2 includes a sulfuric acid production device 10 and a desulfurization device 20 located downstream thereof.

First, the sulfuric acid production device 10 will be described. The sulfuric acid production device 10 mainly includes an $SO_2$ oxidation tower 11 filled with a vanadium pentoxide ($V_2O_5$) catalyst 11a; and an $SO_3$ absorption tower 13 located downstream thereof and having a packed bed 13a including a packing material for gas-liquid contact.

High-temperature gas containing sulfurous acid gas produced by the burning of sulfur or the roasting of sulfides or the like is supplied as raw material gas to the $SO_2$ oxidation tower 11, in which sulfurous acid gas in the raw material gas is oxidized to produce sulfur trioxide gas (sulfuric anhydride gas, $SO_3$). The produced gas containing the resulting sulfur trioxide is sent to the bottom of the $SO_3$ absorption tower 13. The packed bed 13a of the $SO_3$ absorption tower 13 contains a packing material, such as CASCADE MINI-RINGS (registered trademark), in which the produced gas containing sulfur trioxide comes into countercurrent gas-liquid contact with an aqueous sulfuric acid solution supplied from the top of the tower. In this process, the sulfur trioxide in the produced gas is absorbed by the aqueous sulfuric acid solution.

The aqueous sulfuric acid solution after absorbing the sulfur trioxide becomes concentrated sulfuric acid having a sulfuric acid concentration higher than that of the aqueous sulfuric acid solution before the absorption, and the concentrated sulfuric acid is discharged from the bottom of the $SO_3$ absorption tower 13. Part of the concentrated sulfuric acid discharged from the $SO_3$ absorption tower 13 is extracted for use as the aqueous sulfuric acid solution to be supplied from the top of the tower as mentioned above. The remaining part of the concentrated sulfuric acid discharged therefrom goes out from the system of the sulfuric acid production device 10 as a product. The aqueous sulfuric acid solution before the absorption and the concentrated sulfuric acid are subjected to liquid circulation for the absorption in the $SO_3$ absorption tower 13 so that their difference in concentration is small and they have substantially the same concentration.

The above-state extracted part of the concentrated sulfuric acid is pressurized by a concentrated sulfuric acid circulation pump 15. The diluting solution supplied through a diluent line 16 is added to the concentrated sulfuric acid at a dilute sulfuric acid mixing apparatus 29 such as an in-line mixer, which thus produces the aqueous sulfuric acid solution supplied from the top of the tower. Dilute sulfuric acid described below and optionally supplied industrial water are used for the diluting solution. The supply rate of the diluting solution is controlled so as to be balanced with the discharge rate of the concentrated sulfuric acid that goes out of the system as a product mentioned above. In this way, concentrated sulfuric acid is produced by contact process.

The produced gas after contact with the aqueous sulfuric acid solution is discharged from the top of the $SO_3$ absorption tower 13 as a discharge gas. This discharge gas contains sulfurous acid that remains unoxidized during the oxidation of the sulfurous acid gas, and sulfur trioxide that remains unabsorbed during the absorption of the sulfur trioxide by the aqueous sulfuric acid solution. Since the discharge gas contains the sulfur oxides including the sulfurous acid and the sulfur trioxide, the discharge gas is sent to the downstream desulfurization device 20, where the sulfur oxides are subject to desulfurized.

In this example of the sulfuric acid production plant 1, the desulfurization device 20 performs desulfurization along with forming a dilute sulfuric acid as by-product using an activated carbon-based catalyst as described below. It is however to be noted that the desulfurization method according to the present invention is not limited to the method using an activated carbon-based catalyst. Although the above-stated discharge gas contains both sulfurous acid and sulfur trioxide, the discharge gas may alternatively contain either sulfurous acid or sulfur trioxide.

In desulfurization treatment of the desulfurization device 20, the desulfurization performance becomes high when the gas being treated has a high humidity and a relatively high temperature in the range not more than 100° C., and therefore the desulfurization is performed at a normal gas temperature of about 30 to 60° C. in the presence of oxygen and steam. On the other hand, the outlet gas from the $SO_3$ absorption tower 13 contains almost no steam although having a temperature of about 85° C. or less (generally 50 to 80° C.) and containing oxygen, and therefore it cannot be efficiently desulfurized if it remains as it is.

Therefore, the desulfurization device 20 is provided with a humidification step upstream of the desulfurization step to add steam to the outlet gas with low humidity from the $SO_3$ absorption tower 13, which is the discharge gas from the sulfuric acid production device 10. A method to add steam to the gas is not limited and it can be, for example, a process in which a packed tower having a packed bed containing a packing material such as CASCADE MINI-RINGS (registered trademark) is used to perform countercurrent contact between water and the gas. This process can efficiently add the steam to the gas.

Figure 2:
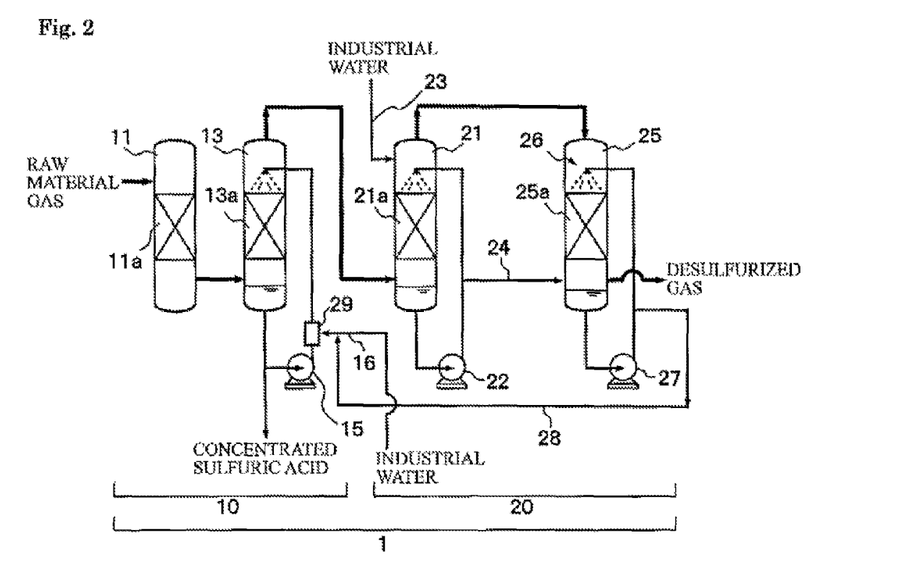
FIG. 2 A schematic flow diagram showing an example of a desulfurization device according to the present invention together with a sulfuric acid production device upstream thereof.

The humidification tower 21 shown in FIG. 2 is a packed tower having a packed bed 21a, into which the discharge gas is introduced from the bottom of the tower and water as a humidifying liquid is allowed to fall from the top of the tower, so that the discharge gas is humidified in the packed bed 21a by gas-liquid countercurrent contact. It is to be noted that gas-liquid contact means such as the above-stated packed tower may be used to remove impurities from the discharge gas.

The humidifying water drip from the packed bed 21a is discharged from the bottom of the humidification tower 21, and then supplied to the top of the humidification tower 21 again after pressurized by a water circulation pump 22. This circulation of the humidifying water makes it possible to efficiently humidify the discharge gas. The amount of the humidifying water circulating through the humidification tower 21 (hereinafter also referred to as the circulating water) gradually decreases because of the humidification of the discharge gas, the entrainment of the water into the gas being discharged from the humidification tower 21, and the liquid transfer through a water transfer line 24 to a desulfurization tower 25 as described below. In order to make up for the decrease of the water, industrial water is supplied from an industrial water supply line 23 to the humidification tower 21 in an amount corresponding to the above-stated decrease.

When the discharge gas is humidified by gas-liquid contact between the discharge gas and the circulating humidifying water as described above, vaporization heat is taken from the humidifying water, which results in temperature decrease to about 5 to 35° C. of the circulating humidifying water and the humidified gas discharged from the top of the humidification tower 21. If this temperature decrease is left as it is, the evaporation rate of water may decrease so that a sufficient steam partial pressure (relative humidity) may not be attained, and the desulfurization performance in the downstream desulfurization tower may decrease.

In order to alleviate this problem, it is preferable to heat the humidifying water or heat a gas to be gas-liquid contact with the humidifying water while performing the humidification. A method for heating the humidifying water can be, for example, heating the water with an electric heater or a heat exchanger provided in the humidifying water circulating system. Alternatively, steam with a low degree of superheat or the like may be directly supplied to the gas. When the heat exchanger is used for heating, a heating medium such as steam may be used as the heat source, or a high-temperature fluid from other apparatus may be used as the heat source.

For example, since the oxidation reaction of sulfurous acid gas in the upstream sulfuric acid production device 10 is accompanied by heat generation, the resulting high-temperature process fluid may be used as the heat source. More specifically, it will be particularly efficient to perform heat exchange, directly or indirectly through a heating medium, between the humidifying water and the high-temperature concentrated sulfuric acid discharged as a product from the bottom of the $SO_3$ absorption tower 13 or the outlet gas discharged from the top of the $SO_3$ absorption tower 13.

The gas humidified in the humidification tower 21 is then supplied to the top of the desulfurization tower 25 having an activated carbon-based catalyst layer 25a. In the desulfurization tower 25, the humidified gas flows through the activated carbon-based catalyst layer 25a from top to bottom. During this downward flow, the unreacted sulfurous acid gas in the humidified gas is oxidized to sulfur trioxide by the action of the activated carbon-based catalyst. The sulfur trioxide formed by this oxidation and the originally contained sulfur trioxide react with water, which is adsorbed on the surface of the activated carbon, to form sulfuric acid ($H_2SO_4$). The sulfuric acid is then washed away and diluted with a washing liquid, which is continuously sprayed from a spray pipe 26 at the top of the desulfurization tower 25, to produce dilute sulfuric acid. The resulting dilute sulfuric acid is discharged from the bottom of the desulfurization tower 25. With this arrangement, the humidified gas is desulfurized. The gas going out of the activated carbon-based catalyst layer 25a is discharged as desulfurized gas from the bottom of the desulfurization tower 25 and then released into the air through a stack or the like.

The activated carbon-based catalyst used in the activated carbon-based catalyst layer 25a is not particularly limited in view of raw material, activating conditions, and shape as long as it can oxidize the adsorbed sulfurous acid gas and then produce the dilute sulfuric acid by reaction with the adsorbed water. Preferably, the activated carbon-based catalyst has high water repellency and oxidizability. For example, a mixture of an activated carbon powder and tetrafluoroethylene or activated carbon fibers and the like is preferably used. These activated carbon-based catalyst are formed to have a spherical shape, a cylindrical shape, a honeycomb shape, or other shapes and then stacked on a wire gauze or a grid support.

When using a cylindrical shape catalyst, it is preferable to use the catalyst having a diameter of about 0.1 to 20 mm and a height of about 0.1 to 20 mm. If the size of the catalyst is too small, the dilute sulfuric acid produced in the activated carbon-based catalyst layer 25a may become difficult to flow downward so that the pressure drop may increase, which is not preferred. On the other hand, if the size of the catalyst is too large, the effective contact surface area in the activated carbon-based catalyst layer 25a may become so small and reduce the efficiency, and the dilute sulfuric acid may fail to smoothly flow out from the inside of the activated carbon-based catalyst layer.

The dilute sulfuric acid discharged from the bottom of the desulfurization tower 25 is pressurized by a dilute sulfuric acid circulation pump 27 and then supplied to the top of the desulfurization tower 25 through a discharge line of the dilute sulfuric acid circulation pump 27 after part of the dilute sulfuric acid is extracted. The discharge line serves as water supply piping to supply water to the activated carbon-based catalyst layer 25a, so that its front end passes through the wall of the top of the desulfurization tower 25 and opens above the activated carbon-based catalyst layer 25a. With this arrangement, the dilute sulfuric acid discharged from the bottom of the desulfurization tower 25 is reused as a washing liquid, except for the extracted part of the dilute sulfuric acid.

This part of the dilute sulfuric acid extracted from the discharge line is supplied to the upstream sulfuric acid production device 10 through a dilute sulfuric acid transfer line 28 that is branched from the discharge line of the dilute sulfuric acid circulation pump 27. The part of the dilute sulfuric acid supplied to the sulfuric acid production device 10 is joined with the aforementioned industrial water from the diluent line 16 if applicable, and then mixed with the part of the concentrated sulfuric acid discharged from the bottom of the $SO_3$ absorption tower 13 in the dilute sulfuric acid mixing apparatus 29, so that the aqueous sulfuric acid solution before absorption is obtained as mentioned above, which is supplied to the top of the $SO_3$ absorption tower 13.

With this arrangement, the sulfur oxides collected at the desulfurization tower 25 as dilute sulfuric acid is supplied to the $SO_3$ absorption tower 13 through the dilute sulfuric acid transfer line 28. This makes it possible to substitute for part or all of the industrial water supplied from outside the system to the $SO_3$ absorption tower 13 with the dilute sulfuric acid produced in the desulfurization tower 25 in accordance with the water balance in the $SO_3$ absorption tower 13, which allows to take advantage of the desulfurization facility using activated carbon forming dilute sulfuric acid as a by-product.

Specifically, in view of the entire sulfuric acid production plant including the desulfurization device, the consumption of industrial water can be reduced, and the sulfur oxides contained in the discharge gas can be easily desulfurized without handling a chemical such as neutralizing alkali or a waste such as sulfate salt, which allows economical desulfurization without imposing costs for chemical purchase and waste treatment. In addition, the dilute sulfuric acid obtained by the desulfurization can be used for the production of concentrated sulfuric acid, which makes it possible to increase the yield of concentrated sulfuric acid as a product.

Meanwhile, since part of the dilute sulfuric acid extracted from the bottom of the desulfurization tower 25 is supplied to the $SO_3$ absorption tower 13 as described above, the process shown in FIG. 2 uses a scheme that water is introduced from the humidification tower 21 to the desulfurization tower 25 through a water transfer line 24 such that an amount of the water introduced therethrough corresponds to the amount of the dilute sulfuric acid extracted from the bottom of the desulfurization tower 25. The inventors have confirmed that continuous desulfurization of the outlet gas from the $SO_3$ absorption tower 13 of this process sometime causes gradual decrease in desulfurization performance.

The inventors have investigated the cause of this gradual decrease in desulfurization performance and have found that nitrosylsulfuric acid dissolves in the sulfuric acid mist in the outlet gas from the $SO_3$ absorption tower 13 is a substance to cause reduction in the activity of the catalyst. The inventors have further found that if concentration of the nitrosylsulfuric acid is low, the catalyst degradation rate becomes low, but the degradation of the catalytic performance can occur over time. Nitrosylsulfuric acid is a nitric acid-related compound that is traditionally used in the production of sulfuric acid by lead chamber process, however it is a substance to cause reduction in the activity of the catalyst used in the lead chamber process.

In the contact process, concentration of nitrosylsulfuric acid contained in the outlet gas of the $SO_3$ absorption tower 13 varies with the type of the raw material gas containing sulfurous acid gas and operating conditions, and it tends to become high as the concentration of nitrogen oxides in the raw material gas is high. For example, when sulfur produced in various facilities is burned to form the raw material gas containing sulfurous acid gas, the nitrosylsulfuric acid concentration tends to be low, but when sulfide ore is roasted, the nitrosylsulfuric acid concentration tends to be high. It has also been found that more nitrosylsulfuric acid is present in puddles in the duct at the top of the $SO_3$ absorption tower 13 and in an apparatus such as a mist eliminator for the $SO_3$ absorption tower 13.

It has been found that the puddles include sulfuric acid and concentration of nitrosylsulfuric acid contained in the puddles are as high as several hundred mg/L although it depends on not only the sulfurous acid gas raw material but also the structure of the apparatus. It has also been found that the puddles can also contain nitric acid-related compounds of same kind such as nitric acid and nitrous acid. Since these compounds are not catalyst poisons, measures should be taken against nitrosylsulfuric acid only.

Based on these findings, the inventors have made intensive studies on methods for preventing the reduction of the catalytic activity by nitrosylsulfuric acid so as to stabilize and improve the desulfurization performance and thus taking advantage of the effect and benefit of the desulfurization facility of dilute sulfuric acid by-product forming type mentioned above. As a result, the inventors have found that it is effective from economical viewpoint to establish a system that prevents nitrosylsulfuric acid from flow into the activated carbon catalyst layer.

Figure 3:
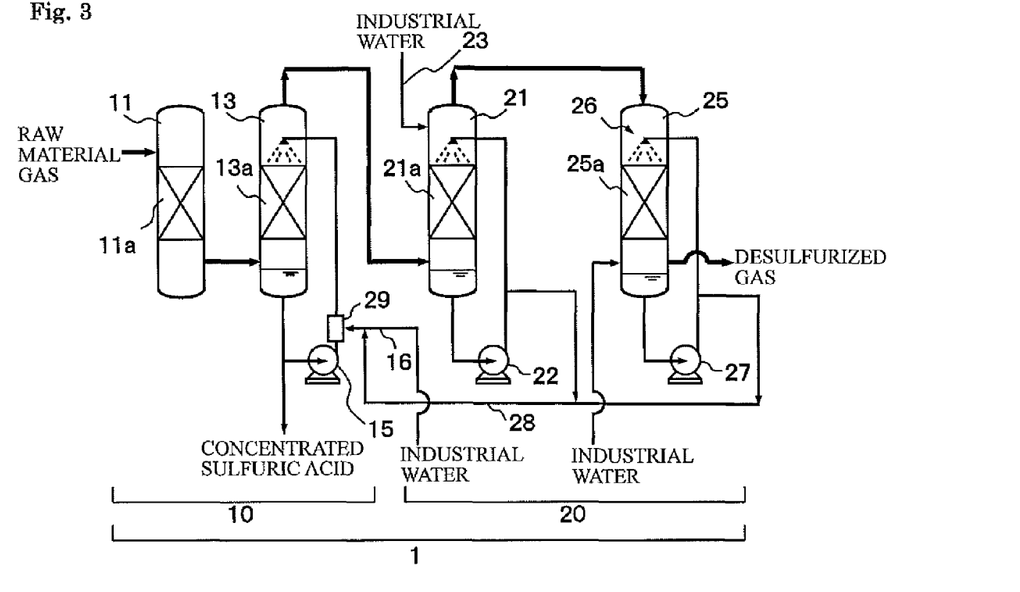
FIG. 3 A schematic flow diagram showing another example of a desulfurization device according to the present invention together with a sulfuric acid production device upstream thereof.

Specifically, the inventors have found that reduction of the catalytic activity due to nitrosylsulfuric acid can be effectively prevented, instead of extracting part of the circulation water of the humidification tower 21 and transferring it to the desulfurization tower 25 as shown in FIG. 2, but transferring the part of the extracted water to the $SO_3$ absorption tower 13 of the upstream sulfuric acid production device 10 and used it as a diluting solution together with the dilute sulfuric acid drained from the desulfurization tower 25 as shown in FIG. 3. In this case, it is necessary to supply industrial water from outside the system to the desulfurization tower 25 in an amount corresponding to the amount of the dilute sulfuric acid extracted from the discharge line of the water circulation pump 22. In addition, it is more effective to provide a mist eliminator (not shown) at the top of the humidification tower 21 such that a nitrosylsulfuric acid-containing mist can be prevented from being entrained in the gas supplied from the humidification tower 21 to the desulfurization tower 25.

In addition, nitrosylsulfuric acid vapor, which could be contained in the humidified gas, may be effectively removed by providing a water washing tower in a line connecting the top of the humidification tower 21 to the top of the desulfurization tower 25 or providing several water washing trays constituting of bulb trays or the like above the humidification tower 21. In this case, the above-stated industrial water supplied from an industrial water supply line 23 is preferably used as washing water in the water washing tower or the trays before supplied to the humidification tower 21.

As mentioned above, the amount of the industrial water supplied from the industrial water supply line 23 is determined in consideration of the water balance in the humidification tower 21. Consequently, it is possible to omit the provision of the water washing means, the trays, or the like and at least part of the water may be transferred through the water transfer line 24 as long as the concentration of nitrosylsulfuric acid and sulfuric acid in the circulating water of the humidification tower 21 is sufficiently low, and thus the contamination of the desulfurization tower 25 with nitrosylsulfuric acid due to vapor pressure or the entrainment in the gas will be substantially insignificant, or the contamination of the desulfurization tower 25 with nitrosylsulfuric acid associated with the transfer of water through the water transfer line 24 is substantially insignificant.

As for the water balance, the dilute sulfuric acid from the desulfurization tower 25 may be allowed to flow back into the humidification tower 21. However, it has been confirmed by experiments that this process decreases the water evaporation rate due to an increase in the concentration of sulfuric acid in the humidification tower 21, so that the desulfurization performance in the desulfurization tower 25 decreases, although the inflow of nitrosylsulfuric acid can be suppressed. This also suggests that it is preferable to achieve both the prevention of the inflow of nitrosylsulfuric acid from the humidification tower 21 to the desulfurization tower 25 and the suppression of an increase in the concentration of sulfuric acid in the circulating water of the humidification tower 21.

Figure 4:
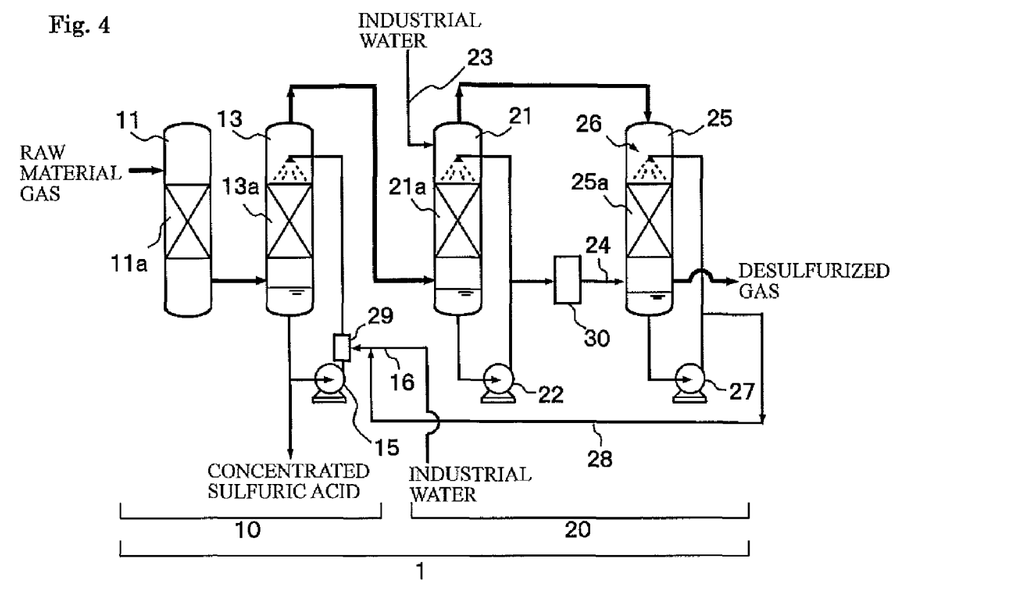
FIG. 4 A schematic flow diagram showing a further example of a desulfurization device according to the present invention together with a sulfuric acid production device upstream thereof.

The method shown in FIG. 3 uses a system established to prevent the contamination of the desulfurization tower 25 with nitrosylsulfuric acid such that the reduction in catalytic activity can be suppressed. Instead of or together with this process, a treatment for decomposing nitrosylsulfuric acid contained in the circulating water of the humidification tower 21 may be performed. A method for decomposing nitrosylsulfuric acid may include, for example, as shown in FIG. 4, providing a nitrosylsulfuric acid decomposition tank 30 in the water transfer line 24 for transferring water from the humidification tower 21 to the desulfurization tower 25; and adding an oxidizing agent to the water being transferred so that nitrosylsulfuric acid, that is a catalyst poison, can be decomposed.

The use of this method makes it possible to increase the flexibility of the system for the water balance and to facilitate operation and control, so that a simpler desulfurization facility can be achieved. Hydrogen peroxide, hypochlorous acid, ozone, persulfuric acid, or the like may be used as an oxidizing agent to decompose nitrosylsulfuric acid. Among them, hydrogen peroxide and ozone are preferred because these chemicals do not remain in concentrated sulfuric acid as a product. When economy is important, oxygen-containing gas such as air may be blown into the water to be treated in the presence of a catalyst such as activated carbon so as to oxidize and decompose nitrosylsulfuric acid.

Alternatively, the nitrosylsulfuric acid decomposition tank 30 may be provided in the circulation system of the humidification tower 21 or in a bypass line thereof, so as to decompose nitrosylsulfuric acid as a catalyst poison by adding an oxidizing agent to the circulating water received in the decomposition tank 30. In the method of FIG. 4, the liquid obtained by removing nitrosylsulfuric acid with the decomposition tank 30 is supplied to the activated carbon-based catalyst layer 25a in the desulfurization tower 25 and used as a water source. Instead of or together with this method, the liquid obtained by removing nitrosylsulfuric acid may be mixed with the aqueous sulfuric acid solution in the concentrated sulfuric acid production step together with the dilute sulfuric acid from the desulfurization tower 25.

The desulfurization method according to the present invention to be applied to a sulfuric acid producing device of contact process has been described with reference to an example of a sulfuric acid production plant. It should be understood that the present invention is not limited to such an example and various alternatives and modifications can be devised without departing from the gist of the present invention. For example, the outlet gas from the $SO_3$ absorption tower 13 and the inlet gas to the desulfurization tower 25 may be subjected to heat exchange using a gas-gas heater, so that the desulfurization performance can be further improved.

The outlet gas from the $SO_3$ absorption tower 13 and the outlet gas from the desulfurization tower 25 may also be subjected to heat exchange for the purpose of preventing the emission of white smoke from a stack and preventing the corrosion of a duct to the stack. The sulfuric acid production plant configured to perform the oxidation step and the concentrated sulfuric acid production step may receive dilute sulfuric acid produced by another plant, and the received dilute sulfuric acid may be mixed with part of the concentrated sulfuric acid to form part or all of the aqueous sulfuric acid solution.

When a source of sulfurous acid gas is obtained from burnt sulfur, the concentration of oxygen in the gas may decrease. In such a case, air may be introduced into the humidification tower 21 or an upstream thereof to increase the oxygen concentration. As in the case of the above-stated humidification tower 21 provided with a mist eliminator, other apparatus that handle an aqueous solution such as the $SO_3$ absorption tower 13 and the desulfurization tower 25 may also be provided with mist collecting means such as a mist eliminator or an electrostatic precipitator to improve the mist removal rate and prevent a mist generated in these apparatus from being entrained in the gas flowing downstream.

Figure 5:
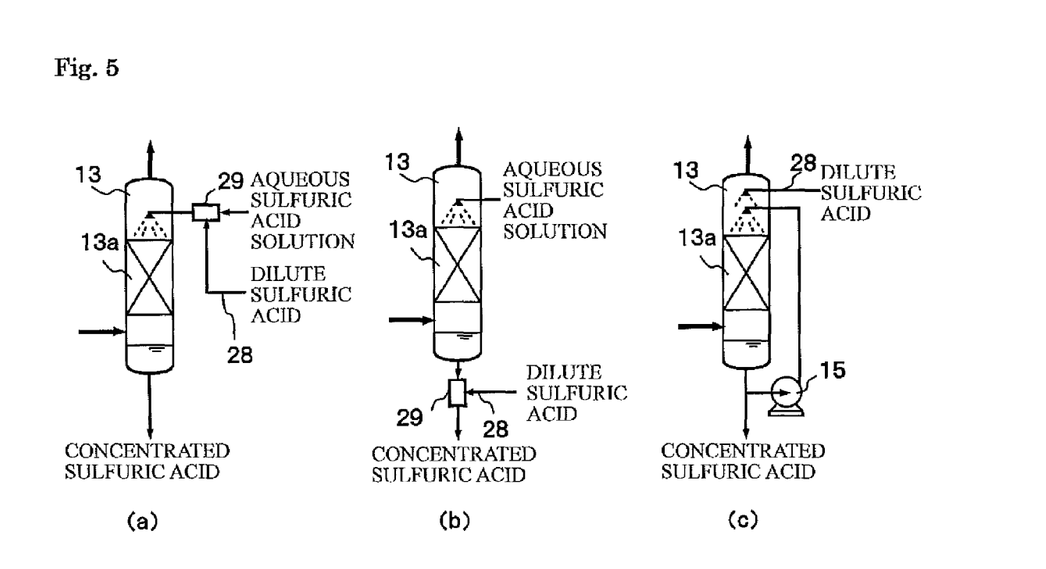
FIG. 5 Schematic flow diagrams showing various modifications of means for mixing a dilute sulfuric acid, produced in a desulfurization device according to the present invention, and an aqueous sulfuric acid solution.

In the above-stated example of the sulfuric acid production plant according to the present invention, dilution of the aqueous sulfuric acid solution is performed by mixing the dilute sulfuric acid with the aqueous sulfuric acid solution being recycled from the bottom to the top of the $SO_3$ absorption tower 13. The dilution of the aqueous sulfuric acid solution is not limited to this example and various embodiments are possible depending on the concentration of the available aqueous sulfuric acid solution, the desired concentration of the concentrated sulfuric acid, and other conditions. As shown in FIG. 5(a), for example, dilute sulfuric acid may be mixed with the aqueous sulfuric acid solution introduced from the outside before the absorption, or as shown in FIG. 5(b), dilute sulfuric acid may be mixed with the aqueous sulfuric acid solution after the absorption. Alternatively, as shown in FIG. 5(c), dilute sulfuric acid may be directly supplied to the top of the $SO_3$ absorption tower 13 in parallel with the supply of the recycling aqueous sulfuric acid solution mentioned above.

As described above, in the example shown in FIG. 2, part of the concentrated sulfuric acid extracted from the $SO_3$ absorption tower 13 as an aqueous sulfuric acid solution is diluted; and then the diluted aqueous sulfuric acid solution is allowed to absorb sulfur trioxide gas to produce concentrated sulfuric acid. Alternatively, concentrated sulfuric acid may be produced by absorbing sulfur trioxide gas to the aqueous sulfuric acid solution, and then diluting the aqueous sulfuric acid solution (FIG. 5(b)). Further, concentrated sulfuric acid may be produced by diluting the aqueous sulfuric acid solution while absorbing sulfur trioxide gas thereto (FIG. 5(c)). It is to be noted that a flow line of industrial water to be added as needed is omitted from FIGS. 5(a) to 5(c).

EXAMPLES

Example 1

An experimental device was assembled in accordance with the flow shown in FIG. 2. Using the device, an experiment was performed in which an outlet gas discharged from the $SO_3$ absorption tower 13, which produces concentrated sulfuric acid by absorbing $SO_3$ gas, was continuously desulfurized by introducing the outlet gas into the dilute sulfuric acid by-product forming type desulfurization device 20 consisting of the humidification tower 21 and the desulfurization tower 25. The activated carbon-based catalyst layer 25a was formed by mixing and kneading an activated carbon powder and a polytetrafluoroethylene dispersion, forming the kneaded product into flat sheets, corrugating some of the sheets, and stacking the flat and corrugated sheets alternately. Table 1 below shows the operating conditions during the desulfurization experiment.

TABLE 1

| | |
|---|---|
| Amount of outlet gas from $SO_3$ absorption tower 13 | 1 m³/h |
| Concentration of sulfur oxide (gas) at inlet of humidification tower 21 | 600 to 900 ppmv (dry gas basis) |
| $O_2$ concentration at inlet of humidification tower 21 | 4 to 7 vol % (dry gas basis) |
| Gas temperature at inlet of humidification tower 21 | 60 to 75° C. |
| Gas temperature at inlet of desulfurization tower 25 | 20 to 30° C. (with heat release) |
| Filling amount of activated carbon-based catalyst | 0.25 L |

As a result of the desulfurization experiment under the above conditions, the sulfurous acid gas removal rate (average) changed over time as follows: 78% immediately after the start of the experiment, 75% after 10 hours, 65% after 200 hours, and 58% after 400 hours. The dilute sulfuric acid was discharged from the desulfurization tower 25 such that the sulfuric acid concentration thereof was controlled to 5 to 7 wt %.

After a lapse of 400 hours, the supply of industrial water to the humidification tower 21 and the circulation of the humidifying water were stopped. As a result, it was found that the desulfurization rate decreased faster than the above. The whole amount of the degraded, activated carbon-based catalyst was taken out and then washed by being immersed in water. The washed catalyst was then charged again and subjected to the examination of the desulfurization performance. As a result, the performance was significantly lower than the initial desulfurization rate at the start of the experiment.

Example 2

A desulfurization experiment was performed under the same conditions as those in Example 1, except that in accordance with the flow shown in FIG. 3, the circulating water for the humidification tower 21 extracted from the discharge line of the water circulation pump 22 was supplied to the dilute sulfuric acid mixing apparatus 29 instead of the desulfurization tower 25. As a result, the desulfurization rate (average) was stabilized after several tens hours, and even after a lapse of 400 hours, the rate was around 75% with no reduction observed.

After a lapse of 400 hours, a reagent of nitrosylsulfuric acid was added to the circulating liquid for the desulfurization tower 25 such that a concentration thereof become around 15 mg/L. As a result, the desulfurization performance quickly decreased. This demonstrated that nitrosylsulfuric acid is a catalyst degradation factor.

Example 3

A desulfurization experiment was performed under the same conditions as those in Example 2, except that the circulating water for the humidification tower 21 was heated to around 45° C. with a heater. As a result, the desulfurization rate (average) was around 84 to 88% after a lapse of 400 hours. Thus, it was found that heating of the humidifying water being used in the humidification tower 21 makes it possible to keep the desulfurization performance of the desulfurization tower 25 at a high level.

Example 4

In accordance with the flow shown in FIG. 4, a decomposition tank 30 filled with 0.5 L of activated carbon 3 mm in characteristic particle size was provided in the water transfer line 24 so that the water from the humidification tower 21 was subjected to a decomposition treatment and then transferred to the desulfurization tower 25. The water extracted from the discharge line of the water circulation pump 22 for the humidification tower 21 at 1.5 L/h was introduced into the decomposition tank 30 while air was blown at a flow rate of 0.5 L/min into the tank 30 from below such that nitrosylsulfuric acid was subjected to a decomposition treatment. A desulfurization experiment was performed under the same conditions as those in Example 1, except for the above conditions.

As a result, the nitrosylsulfuric acid decomposition rate was 84 to 88% after a lapse of 400 hours. The water being introduced into the decomposition tank 30 from the humidification tower 21 contained a nitrosylsulfuric acid having concentration of 50 mg/L and a sulfuric acid having concentration of 0.2 wt %. Thus, it was found that when nitrosylsulfuric acid in the water for the humidification tower 21 is subjected to a decomposition treatment before the water is transferred to the desulfurization tower 25, degradation of the catalyst induced by the nitrosylsulfuric acid can be prevented, so that the desulfurization performance of the desulfurization tower 25 can be kept at a higher level.

Example 5

A desulfurization experiment was performed as in Example 4, except that the concentration of nitrosylsulfuric acid in the water being introduced into the decomposition tank 30 from the humidification tower 21 was 10 mg/L instead of 50 mg/L and that part of the water extracted from the discharge line of the water circulation pump 22 for the humidification tower 21 was supplied to the decomposition tank 30, the liquid discharged at 5 mg/h from the tank 30 after the decomposition was added to the desulfurization tower 25, and the remaining part of the water discharged therefrom was supplied to the dilute sulfuric acid mixing apparatus 29.

As a result, the desulfurization rate (average) was kept at 70% or more after 400 hours. Thus, it was found that when part of the water discharged from the circulating water for the humidification tower 21 is subjected to a decomposition treatment and then supplied to the desulfurization tower 25 and the remaining part is transferred to the $SO_3$ absorption tower, the degradation of the catalyst can be prevented so that the desulfurization performance can be maintained for a long time.

REFERENCE SIGNS LIST 1 sulfuric acid production plant
10 sulfuric acid production device
11 $SO_3$ oxidation tower
11a vanadium pentoxide catalyst
13 $SO_3$ absorption tower
13a packed bed
15 concentrated sulfuric acid circulation pump
16 water supply line
20 desulfurization device
21 humidification tower
21a packed bed
22 water circulation pump
23 industrial water supply line
24 water transfer line
25 desulfurization tower
25a activated carbon-based catalyst layer
26 spray pipe
27 dilute sulfuric acid circulation pump
28 dilute sulfuric acid transfer line
29 dilute sulfuric acid mixing apparatus
30 decomposition tank.

The invention claimed is:

1. A method for desulfurizing a discharge gas which contains sulfur oxides and which was discharged from a device for sulfuric acid production that includes a concentrated-sulfuric-acid production step in which sulfur trioxide gas obtained by oxidizing sulfur dioxide gas is absorbed in an aqueous sulfuric acid solution while supplying water thereto to thereby produce sulfuric acid having a concentration as high as 90 wt % or more but less than 99 wt %, the method comprising:
 a desulfurization step in which the sulfur oxides are removed from the discharge gas and, simultaneously therewith, dilute sulfuric acid is formed from the sulfur oxides; and
 a mixing step which, in the concentrated-sulfuric-acid production step, mixes the dilute sulfuric acid with the aqueous sulfuric acid solution,
 wherein the dilute sulfuric acid is produced by bringing the discharge gas into contact with an activated carbon-based catalyst together with water in the presence of oxygen.

2. The method according to claim 1, further comprising a humidification step for humidifying the discharge gas by bringing the discharge gas into contact with a humidifying liquid before the discharge gas is brought into contact with the activated carbon-based catalyst.

3. The method according to claim 2, wherein at least part of the humidifying liquid having come into contact with the discharge gas is mixed with the aqueous sulfuric acid solution together with the dilute sulfuric acid in the concentrated sulfuric acid production step.

4. The method according to claim 2, further comprising a removal step for removing nitrosylsulfuric acid from at least part of the humidifying liquid having come into contact with the discharge gas, wherein a liquid obtained by the removal of nitrosylsulfuric acid is used as the water.

5. The method according to claim 4, wherein the removal step for removing nitrosylsulfuric acid comprises a method of adding one or both of hydrogen peroxide and ozone or a method of bringing the at least part of the humidifying liquid into contact with activated carbon while introducing air.

6. The method according to claim 2, further comprising a removal step for removing nitrosylsulfuric acid from at least part of the humidifying liquid having come into contact with the discharge gas, wherein a liquid obtained by the removal of nitrosylsulfuric acid is mixed with the aqueous sulfuric acid solution in the concentrated sulfuric acid production step together with the dilute sulfuric acid.

7. The method according to claim 6, wherein the removal step for removing nitrosylsulfuric acid comprises a method of adding one or both of hydrogen peroxide and ozone or a method of bringing the at least part of the humidifying liquid into contact with activated carbon while introducing air.

8. The method according to claim 2, further comprising a heating step for heating at least part of the humidifying liquid having come into contact with the discharge gas, wherein the heated liquid is used as the humidifying liquid.

9. A desulfurization device for desulfurizing a discharge gas which contains sulfur oxides and which was discharged from a device for sulfuric acid production that includes a concentrated-sulfuric-acid production step in which sulfur trioxide gas obtained by oxidizing sulfur dioxide gas is absorbed in an aqueous sulfuric acid solution while supplying water thereto to thereby produce sulfuric acid having a concentration as high as 90 wt % or more but less than 99 wt %, the desulfurization device comprising:
desulfurization means in which the sulfur oxides are removed from the discharge gas and, simultaneously therewith, dilute sulfuric acid is formed from the sulfur oxides; and
mixing means which mixes the dilute sulfuric acid with the aqueous sulfuric acid solution,
wherein the desulfurization means includes humidification means which humidifies the discharge gas by bringing the discharge gas into contact with a humidifying liquid, a desulfurization tower configured to receive the discharge gas humidified by the humidification means, an activated carbon-based catalyst contained in the desulfurization tower, and a water supply pipe connected to the desulfurization tower in order to supply water to the activated carbon-based catalyst.

10. The desulfurization device according to claim 9, wherein the mixing means is configured to mix at least part of the humidifying liquid having come into contact with the discharge gas with the aqueous sulfuric acid solution in the concentrated sulfuric acid production step together with the dilute sulfuric acid.

11. The desulfurization device according to claim 9, further comprising nitrosylsulfuric acid removal means which removes nitrosylsulfuric acid from at least part of the humidifying liquid having come into contact with the discharge gas, wherein a liquid obtained by the removal of nitrosylsulfuric acid is supplied to the activated carbon-based catalyst.

12. The desulfurization device according to claim 9, further comprising heating means for heating at least part of the humidifying liquid having come into contact with the discharge gas, wherein the humidifying means is configured to use the heated liquid as the humidifying liquid.

13. A sulfuric acid production plant comprising:
concentrated-sulfuric-acid production means in which sulfur trioxide gas obtained by oxidizing sulfur dioxide gas is absorbed in an aqueous sulfuric acid solution while supplying water thereto to thereby produce sulfuric acid having a concentration as high as 90 wt % or more but less than 99 wt %;
mixing means for mixing dilute sulfuric acid produced by removing sulfur oxides from a discharge gas containing the sulfur oxides with the aqueous sulfuric acid solution in the concentrated-sulfuric-acid production means; and
desulfurization means includes humidification means which humidifies the discharge gas by bringing the discharge gas into contact with a humidifying liquid, and a desulfurization tower configured to receive the discharge gas humidified by the humidification means, an activated carbon-based catalyst contained in the desulfurization tower, and a water supply pipe connected to the desulfurization tower in order to supply water to the activated carbon-based catalyst.

14. The sulfuric acid production plant according to claim 13, wherein the mixing means is configured to mix at least part of a humidifying liquid having come into contact with the discharge gas with the aqueous sulfuric acid solution in the concentrated sulfuric acid production means together with the dilute sulfuric acid.

* * * * *